(No Model.) 2 Sheets—Sheet 2.
A. W. LOCKHART.
FEED REGULATOR FOR THRASHING MACHINES.
No. 334,024. Patented Jan. 12, 1886.
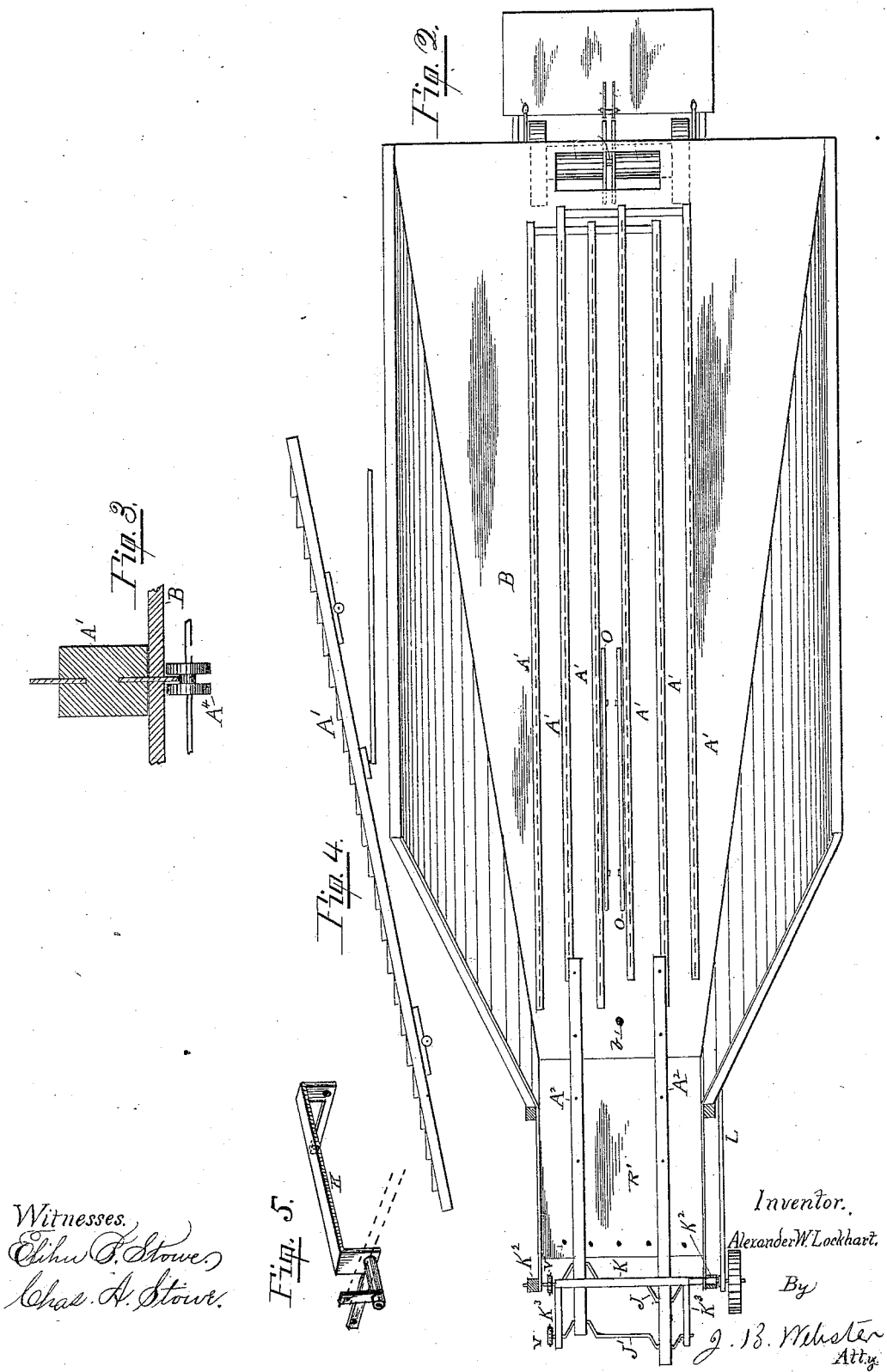
Witnesses.
Elihu P. Stowe
Chas. A. Stowe
Inventor.
Alexander W. Lockhart.
By
J. B. Webster
Atty.

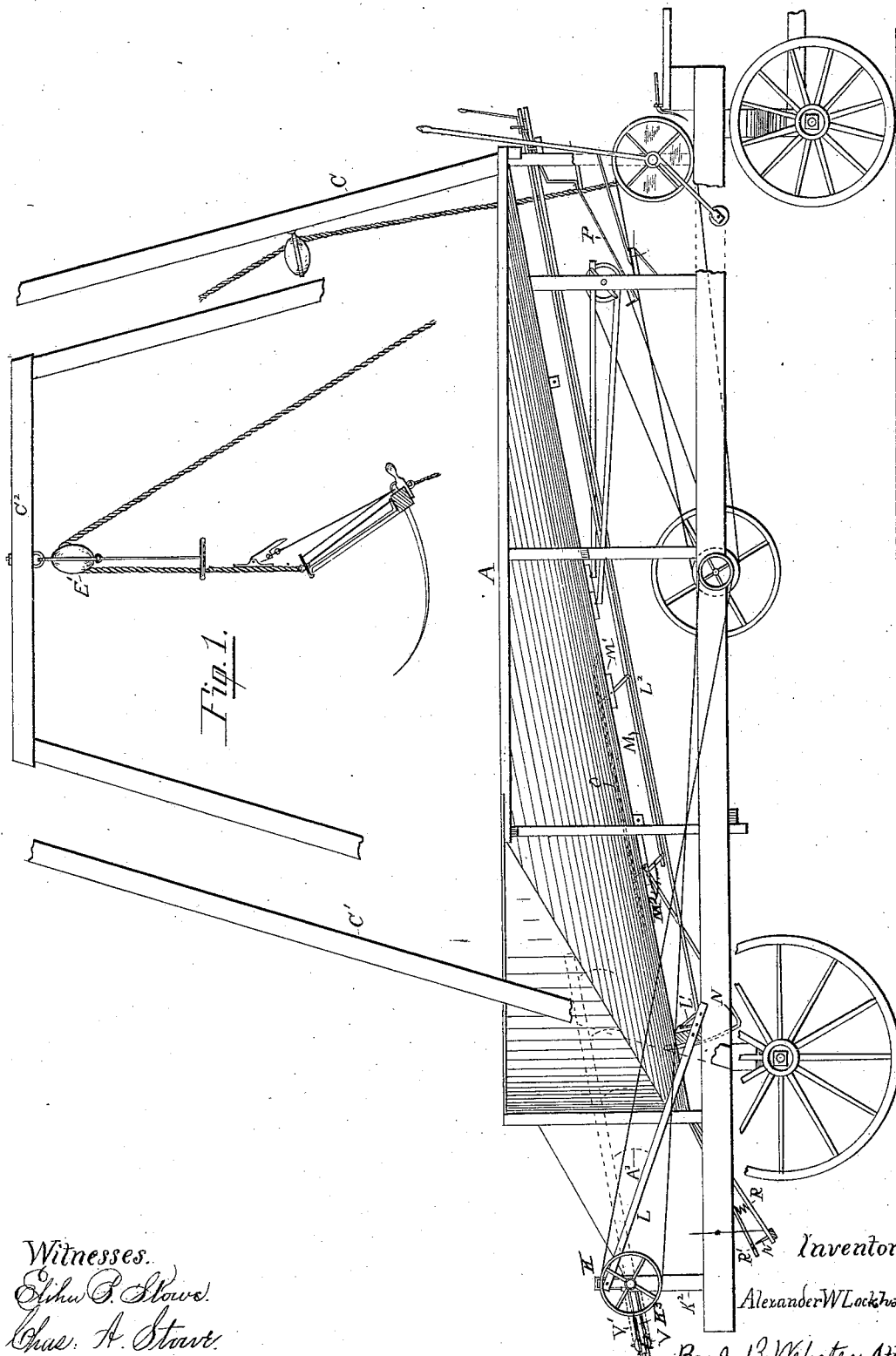

UNITED STATES PATENT OFFICE.

ALEXANDER W. LOCKHART, OF STOCKTON, CALIFORNIA.

FEED-REGULATOR FOR THRASHING-MACHINES.

SPECIFICATION forming part of Letters Patent No. 334,024, dated January 12, 1886.

Application filed January 24, 1885. Serial No. 153,824. (No model.)

*To all whom it may concern:*

Be it known that I, ALEXANDER W. LOCKHART, a citizen of the United States, residing at Stockton, in the county of San Joaquin and State of California, have invented certain new and useful Improvements in Feed-Regulators for Thrashing-Machines, of which the following is a specification, reference being had therein to the accompanying drawings.

My invention relates to improvements in feed-regulating and supplying devices for thrashing-machines, and is designed to produce a device that shall receive the unthrashed grain in bulk from the horse-forks or other devices and deliver it gradually and evenly to a conveyer, which carries it to the thrashing-machine. The mechanism is such that the said unthrashed grain reaches the conveyer with a steady, even flow despite the fact that it is delivered from the fork in compact masses and with no comparative regularity.

Referring to the accompanying drawings, Figure 1 is a side elevation. Fig. 2 is a top view of the machine without the derrick. Fig. 3 is a transverse section of a sliding notched feeding-bar and a portion of the floor and roller. Fig. 4 is a side view of a sliding notched feeding-bar with propelling attachment; Fig. 5, a detail perspective of the moving frame at the throat or rear of the machine.

A is a large table-like straw-receiving hopper, having a bottom, B, inclined so as to discharge at its rear end. This hopper is attached to any proper frame, which supports it, and has suitable carrying-wheels for transporting it from place to place. The bottom B of the hopper A is provided with longitudinal sliding notched feeding-bars A', which are connected with rollers A⁴ beneath the bottom B, upon which is dumped the straw from the forks D. The bars A' are actuated by connecting-levers from beneath, connected with suitable driving mechanism, moving the straw rearwardly and delivering it beneath the forward ends of a series of automatically-adjusting arms, A², provided with teeth A³, and which are actuated by two crank-shafts, J and J', and propel the straw toward any suitable carrying-belt, which delivers it at the mouth of the cylinder of the thrasher. When there is an over-accumulation of straw at the receiving ends of the arms A², they are forced upward for the purpose and in the manner as will be shown. A cast-iron frame, K, has sleeves at either end resting in slots on the side timbers, K², of the throat of the machine, and serving as boxes for the forward crank-shaft, J, and has also rearwardly-extending arms K³, provided with sleeves, which engage with and furnish boxes for the rear crank-shaft, J'. To one of the sides of the frame K is attached a connecting-rod, L, which connects beneath the bottom B of the hopper with a rock-shaft, L', to which is also attached forwardly-extending connecting-rod L², which connects at its front end with a connecting-rod, M, having a handle. The rod M extends rearwardly, and by means of pivoted levers M' connects with and operates relief-bars O within the hopper and parallel to the bars A'. As the rod M is moved to the rear, the bars O will move forward and be elevated by means of the pivoted links. From the rear of the rod M, by means of an angle-rod, M², pivoted at the angle, a tooth, N, is supported, extending upward through the bottom B, the passage being shown at bottom *b*, Fig. 2. The said tooth N is integral with the rod M², and is raised at the same time as are the bars O by the rearward movement of the bar M. The bars O will raise the straw from the feed bars A', and thereby nullify their operation for the time being, while the tooth N will engage with the said straw and prevent further rearward movement. This operation occurs only when the feed is too rapid and the devices act as a governor. When the feed is such as to carry a surplus of the straw to the toothed arms A², they are pressed upward thereby, carrying the frame K downward, through an arc of which the shaft J is the center. This causes a rearward movement of the parts L, L², and M, and the relief mechanism is operated as described above. Thus the same is automatic, but may at any time be operated by hand by pressing the bar M to the rear by means of the handle at its forward end. A belt-shifting lever, P, can be connected with the connecting-rod L², having the effect, when the toothed arms A² rise upwardly, carrying with them the cap K and connecting-rods L and L², to shift the driving-belt from its actuating-pulley to an idle-pulley alongside. The same result by manual aid can be obtained by the spool-operator handling the belt-shifting lever P without attaching it to the connecting-rod L². The flow of the straw from the rear of the machine is controlled, in connection with the toothed arm A², by an automatically-adjustable throat-bottom, consisting of a bottom board, R, hinged to the rear of the machine to the edge of the hopper-bottom B, and of a top board, R', hinged at the same point of connection. The bottom board, R, is connected at its delivery end to the side timber of the machine, preferably by a leather strap, by means of which it may be raised or depressed, as required. Between the boards R and R' is located a spring, so that the board R' may yield to the pressure of the straw passing between it and the arms A² above. Teeth r have their seats in board R and extend upwardly through openings in board R', so that when an unusual amount of straw presses down the board R' the teeth project and come into action and hold back the straw from a too rapid exit, and control the volume being supplied to the feeder en route to the cylinder of the thrasher.

In order that the stroke of the crank-shafts J and J' may be uniform, and both pass a common center at the same time, I provide each of said shafts with a sprocket-wheel, V, connected by chain-wheel V', so that when the front shaft, J, is put in motion the rear shaft, J', must act with it.

I have not described at length the various actuating mechanism, which is old and well known, only making such allusions thereto as will sufficiently connect the various features of my invention therewith.

I do not intend to limit myself to the exact construction and combination of parts as herein described, as many deviations therefrom may be made without departing from the spirit of my invention.

I do not claim the fork and its hoisting mechanism in this application, as I shall make them the subject-matter of another application, they being shown in connection with the device claimed to more fully set forth its operation.

What I claim as new and of my invention, and desire to secure by Letters Patent, is—

1. A hopper with an inclined bottom provided with reciprocating feeding-bars, in combination with relief-bars operating in conjunction with the feeding-bars and automatically-adjustable toothed arms, receiving the grain from the said feeding-bars and delivering it to the conveyer of the thrashing-machine, substantially as and for the purpose specified.

2. The combination of the tooth N, connecting-rod M, rod L², relief-bars O, connecting-levers M', rod L, frame K, arms A², and shafts J and J', all operating substantially as and for the purpose specified.

3. The combination of the bars A' and their operating mechanism, the shifting-lever P, rod L², rod L, frame K, and toothed bars A², substantially as and for the purpose specified.

4. The automatically-adjustable arms A² and crank-shafts supporting them at more than one point, combined with the frame which is pivotally supported on one of said crank-shafts, substantially as specified.

5. The combination of the hopper, the frame K, crank-shafts J and J', toothed arms A², and boards R and R', hinged to the rear of the hopper, one of the boards being provided with teeth which extend through the other board, substantially as and for the purpose specified.

6. The combination, with the toothed arms, of the crank-shafts supporting said arms at more than one point and moving coincidently, the frame K, forming journal-bearings for the shafts, and the sprocket-wheels and chain, substantially as and for the purpose specified.

7. In combination with the crank-shafts carrying the toothed arms, the sprocket-wheels and chain and the frame forming the journal-bearings for the shafts, substantially as and for the purpose specified.

8. The combination of the rod L, frame K, crank-shafts J and J', toothed arms A², sprocket-wheels V, rod L², rod M, the feed-bars, and the relief-bars, all connected and operating substantially as and for the purpose specified.

In testimony whereof I affix my signature in presence of two witnesses.

ALEXANDER W. LOCKHART.

Witnesses:
ELIHU B. HOWE,
JOSHUA B. WEBSTER.